(12) United States Patent
Chang

(10) Patent No.: US 7,849,046 B2
(45) Date of Patent: Dec. 7, 2010

(54) ONLINE CONSULTATION SYSTEM, ONLINE CONSULTATION APPARATUS AND CONSULTATION METHOD THEREOF

(75) Inventor: Ching-Tzun Chang, Taipei (TW)

(73) Assignee: Uniwill Computer Corp., Taipei County (TW)

( * ) Notice: Subject to any disclaimer, the term of this patent is extended or adjusted under 35 U.S.C. 154(b) by 1037 days.

(21) Appl. No.: 11/607,968

(22) Filed: Dec. 4, 2006

(65) Prior Publication Data

US 2007/0271237 A1 Nov. 22, 2007

(30) Foreign Application Priority Data

May 16, 2006 (TW) .............................. 95117397 A

(51) Int. Cl.
*G06F 17/00* (2006.01)
*G06F 7/00* (2006.01)

(52) U.S. Cl. ..................................... 707/600

(58) Field of Classification Search ....................... None
See application file for complete search history.

(56) References Cited

U.S. PATENT DOCUMENTS 6,462,676 B1 * 10/2002 Koizumi ................. 340/995.1
2002/0163547 A1 * 11/2002 Abramson et al. .......... 345/855

\* cited by examiner

*Primary Examiner*—Uyen T. Le
(74) *Attorney, Agent, or Firm*—Rosenberg, Klein & Lee

(57) ABSTRACT

The system includes at least one server, at least one query terminal and at least one answer terminal. The query terminal can utilize the online consultation apparatus of the invention, and transmit at least one query and a coordinate point of the query terminal to the server based on the position of the query terminal. The server then actively transmits the query to the potential answer terminals in the vicinity of the coordinate point of the query terminal. Accordingly, the query terminal could obtain at least one response/answer and a coordinate point of the answer terminal through the server.

35 Claims, 4 Drawing Sheets

# ONLINE CONSULTATION SYSTEM, ONLINE CONSULTATION APPARATUS AND CONSULTATION METHOD THEREOF

FIELD OF THE INVENTION

The present invention relates to an online consultation system, an online consultation apparatus and a consultation method, and more particularly to a technique field that uses relative coordinate positions between query terminals and answer terminals.

BACKGROUND OF THE INVENTION

Although search techniques are well-developed, data management behind the search techniques is the biggest challenge. For example, when a tourist is at a scenic spot, various consultation demands may appear such as "What is the famous product at this scenic spot?", "Which restaurants are recommended for local cuisine here?", and "Are there any places worth visiting around this area?" The tourist may use a telephone or ask somebody or use a notebook computer/a personal digital assistant (PDA) to perform online search. However, if the tourist uses the telephone, the tourist must know who the best answerer is. In addition, the phone number of the best answerer must be known. Moreover, the best answerer must be able to take the phone calls for responding the tourist's questions. Furthermore, if the tourist needs to ask someone a specific question, the tourist has to find the right person in order to get the useful messages. Also, the tourist usually needs to sift from various messages for differentiating true and false. If the tourist uses online search, the tourist would find many answers with the same key words. The tourist needs to spend much time and energy to make sure possible answers.

To overcome the foregoing issues, there is a need for providing a consultation apparatus, a consultation system and a consultation method.

SUMMARY OF THE INVENTION

In view of the foregoing issues, an objective of the present invention is to provide a simple online consultation system by combining the coordinate position of a questioner with the coordinate position of an answerer. When the user uses the online consultation system in a specific region, the user may ask a question such as "Where is the police office?", "Where can I find a restaurant providing the delicious food with a fair price in this area?", and then the question is automatically transmitted by the system to other neighboring system users. The neighboring system users can decide to answer, respond or disregard the question. In addition, the questioner can also give a rating for all responses to the question. Accordingly, while arriving at the specific region, other system users can browse the previous questions and responses or answers of the specific region for the accumulation of related knowledge by using the system.

The online consultation system includes at least one server, at least one query terminal and at least one answer terminal. The server is taken to be a bridge between information communication and storage of these query terminals and answer terminals. After making a query for the information, the query terminal will transmit the query and the coordinate point of the query terminal to the server. Then, the server continually transmits the query to the potential answer terminals in the vicinity of the coordinate point of the query terminal during a predetermined period of time. It should be noted that the range of "the vicinity" is selectively setup by the query terminal like the coordinate point of the query terminal within the range of 10 kilometers (km). After receiving the query, the answer terminals then provide responses/answers and the coordinate points of the answer terminals to the server. Accordingly, the query terminal can browse the responses/answers and the coordinate points of the answer terminals and then give a rating, such as a rating of five stars, to the answer terminals such that the future questioners can previously search the better responses/answers with a high rating before making a query.

All of the responses/answers and the coordinate points of the answer terminals which correspond to the queries are classified, and are stored in the server such that any query terminal may use keywords, coordinate positions or other search approaches to perform pre-(before querying) or post-(after querying) search.

In addition, the query terminal and the answer terminal can use a portable electronic apparatus or an electronic apparatus with internet access for transmitting. The coordinate point of the query terminal or the coordinate point of the answer terminal can be acquired through a global positioning system (GPS) or a coordinate map.

An online consultation apparatus is then disclosed according to the online consultation system. The online consultation apparatus is similar to a portable electronic apparatus. However, a query unit and a display unit disposed on the online consultation apparatus can transmit a coordinate point of the query terminal or at least one question to a server based on the position of the online consultation apparatus. The server then continuously transmits and displays at least one response/answer and the coordinate point of the answer terminal on the display unit in the vicinity of the coordinate point of the query terminal. The coordinate point of the query terminal is obtained by a GPS or a coordinate map. The query unit can selectively give a rating to the response/answer and the answer terminal, and the rating is stored in the server so as to provide other query terminals for a reference. In addition, the coordinate points of the answer terminals received by the query terminal are taken to be navigation information. A navigation system is performed by inputting the coordinate points of the answer terminals or by directly selecting the coordinate points of the answer terminals on the display unit. It should be noted that the responses/answers and the coordinate points are generated by at least one answer terminal, wherein the answer terminal provides responses/answers through a portable electronic apparatus or an electronic apparatus accessible to the internet. The query terminal then receives the coordinate points of the answer terminals by using a GPS or a coordinate map. Moreover, all of the responses/answers and coordinate points are stored in the server such that the query terminal can use keywords, coordinate positions or other search approaches to perform pre-(before querying) or post-(after querying) searches.

In accordance with the online consultation system, the present invention discloses a first online consultation method comprising the following steps:

(a) Transmitting at least one question and a coordinate point of a query terminal to a server based on the position of the query terminal.

(b) Actively transmitting the question obtained from the server at predetermined timing intervals to at least one potential answer terminal in the vicinity of the coordinate point of the query terminal, wherein the range referring to the vicinity can be selectively setup by the query terminal.

(c) Providing by the answer terminal a response/answer and a coordinate point of the answer terminal to the server based on the question.

(d) Transmitting the response/answer and the coordinate point of the answer terminal to the query terminal through the server, and then those responses can be selectively taken to be navigation information.

(e) Giving a rating to the response/answer and the coordinate point of the answer terminal from the query terminal, and transmitting it back to and recording in the server.

In accordance with the online consultation apparatus, the present invention further discloses a second online consultation method comprising the following steps:

(a) A query unit and a display unit are built in an online consultation apparatus or a portable electronic apparatus.

(b) A coordinate point of the query terminal and at least one query are transmitted to a server from the position of the query unit.

(c) The server actively transmits the query to at least one answer terminal in the vicinity of the coordinate point of the query terminal, and the server transmits a response/answer and a coordinate point of an answer terminal to the query unit. The range referring to the vicinity is selectively setup by the query unit.

(d) The response/answer and the coordinate point of the answer terminal are displayed on the display unit.

(e) The query unit gives a rating to the response/answer and the coordinate point of the answer terminal, and then the rating is transmitted back to and stored in the server.

(f) The response/answer and the coordinate point of the answer terminal are selectively taken to be navigation information.

The two online consultation methods are used as the online consultation system or used on the online consultation apparatus. The server stores all of the questions and the responses/answers or the coordinate points of the answer terminals such that the query terminal can perform pre-(before querying) or post-(after querying) searches. In addition, the query terminal and the answer terminal can use a portable electronic apparatus or an electronic apparatus with internet access for transmitting. The coordinate points of the query terminals or the coordinate points of the answer terminals can be acquired through a GPS or a coordinate map.

The invention can be more fully understood by reading following detailed description of the preferred embodiment with reference made to the accompanying drawings.

DETAILED DESCRIPTION OF THE PREFERRED EMBODIMENTS

Figure 1:
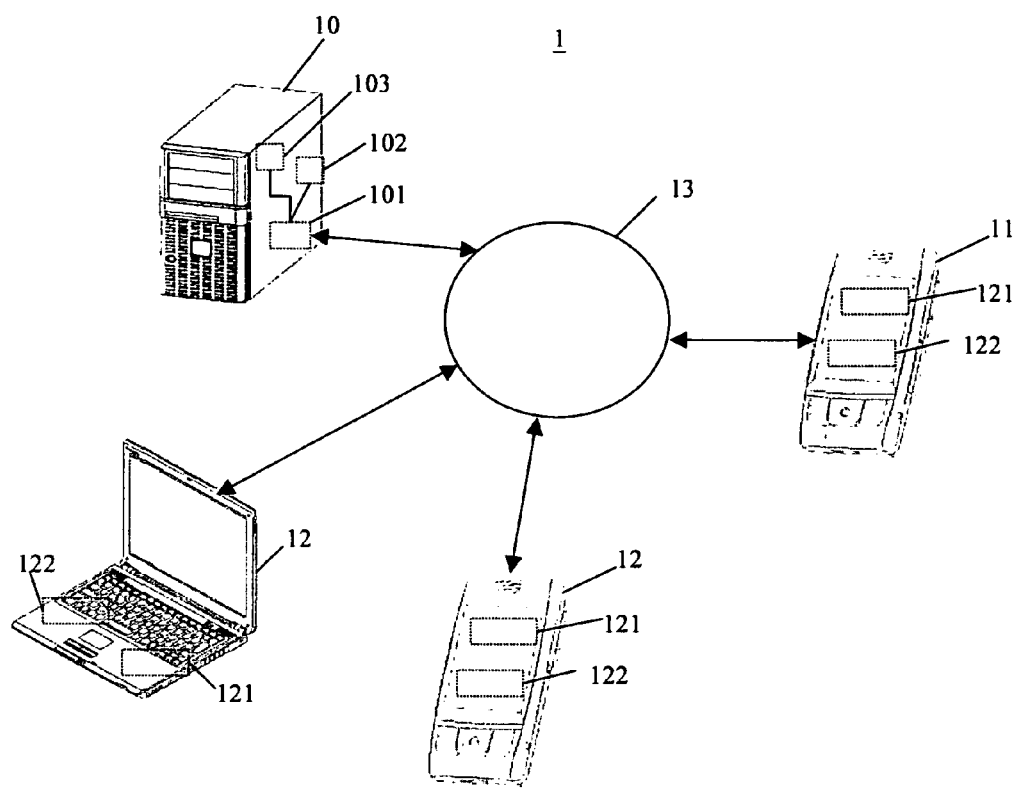
FIG. 1 is a block diagram of an online consultation system of the present invention.

Refer to the related figures for an online consultation system and an online consultation apparatus according to a preferred embodiment of the present invention, wherein the same elements are described by the same reference numerals.

FIG. 1 is a block diagram for illustrating an online consultation system according to an embodiment of the present invention. As shown, the online consultation system 1 comprises a server 10, a query terminal 11 and at least one answer terminal 12. The server 10 includes a local knowledge service unit interface 101, a coordinate database 102 and a question/answer database 103. The knowledge service unit interface 101 is taken to be a bridge between the query terminal 11 and the answer terminal 12. The coordinate database 102 provides the server 10 to record coordinate positions relative to the query terminal 11, the answer terminal 12 and the server 10. The question/answer database 103 is used to store messages between the query terminal 11 and the answer terminal 12 such as questions, responses/answers or a coordinate point of the answer terminal 12. Server/client architecture is applied among the server 10, the query terminal 11 and the answer terminal 12 for operating. A standard Hypertext Markup Language (HTML) is usually taken to be a communication protocol among the server 10, the query terminal 11 and the answer terminal 12. Accordingly, the query terminal 11 and the answer terminal 12 only need to configure browsers which correspond to the communication protocol or compatible communication protocols to perform communication. In addition, the query terminal 11 and the answer terminal 12 also need to be equipped with a GPS 121 or a coordinate map 122 so as to transmit coordinate positions.

As shown in FIG. 1, after making a query for the information, the position of the query terminal 11 is known through the GPS 121 or the coordinate map 122, and then the coordinate point of the query terminal, queries and the vicinity relative to query objects are transmitted by a network 13 matched with hypertext transmission protocol (HTTP) to the server 10. In the meantime, the server 10 actively transmits the query and the coordinate point of the query terminal to potential answer terminals 12 in the vicinity of the coordinate point of the query terminal during a predetermined period of time such as the coordinate point of the query terminal within the range of 10 km. When the answer terminals 12 receive the query, responses/answers and the coordinate points of the answer terminals 12 are transmitted by a network 13 matched with HTTP to the server 10. Accordingly, the query terminal 11 can browse and search the responses/answers and the coordinate points of the answer terminals 12 through the server 10.

Figure 2:
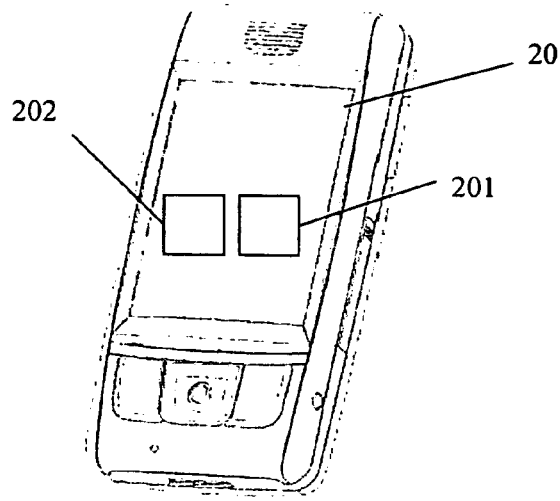
FIG. 2 is a schematic diagram of operating an online consultation apparatus of the present invention.

FIG. 2 is a schematic diagram for illustrating the operation of an online consultation apparatus of the present invention. As shown, the query terminal 11 uses the online consultation apparatus 2 to perform a transmission function. The online consultation apparatus 2 comprises a built-in query unit (not shown) and a display unit 20. The display unit 20 provides a question asking function 201 and a question browsing/searching function 202. The question asking function 201 is taken to be a button selection for the query terminal 11 to activate the asking function. When the query terminal 11 is in a real geographical position, the browsing/searching function 202 connects to the server 10, such that the query terminal 11 can browse and search the previous questions and responses/answers as to the specific region for the accumulation of related knowledge.

Figure 3:
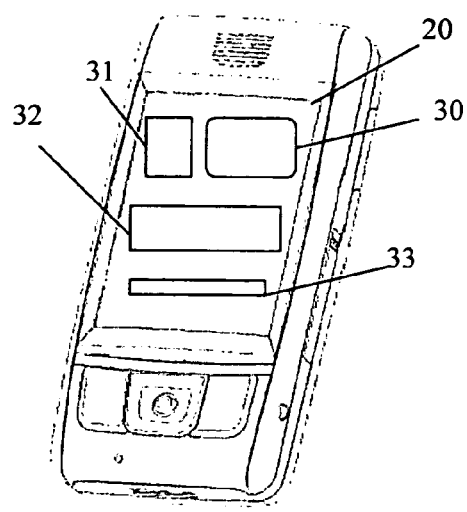
FIG. 3 is a schematic diagram of operating an online consultation apparatus of the present invention.

FIG. 3 is a schematic diagram for illustrating the operation of an online consultation apparatus of the present invention. FIG. 3 shows an asking screen generated by selecting the question asking function 201 displayed on the display unit 20 as shown in FIG. 2. As shown, the display unit 20 usually displays a coordinate map 30, a coordinate point of the query terminal 31, a query input area 32 and a vicinity setup selection 33. The query terminal 11 can input the query to the query input area 32. The query includes "Where exactly is the store at?" or "What is a famous product in the well-known spot?" The coordinate point of the query terminal 31 and the value of the vicinity setup selection 33, together with the query, are transmitted to the server 10. After receiving the query and the coordinate point of the query terminal 31, the server 10 continually transmits the query and the coordinate point of the query terminal to the answer terminal 12 within the range of the vicinity based on the values of the vicinity setup selection 33 such as the coordinate point of the query terminal 31 within the range of 10 km. Accordingly, the answer terminal 12 selectively transmits the responses/answers and the coordinate point of the answer terminal to the server 10 such that the query terminal 11 can browse answers by using the question browsing/searching function 202 as shown in FIG. 2.

Figure 4:
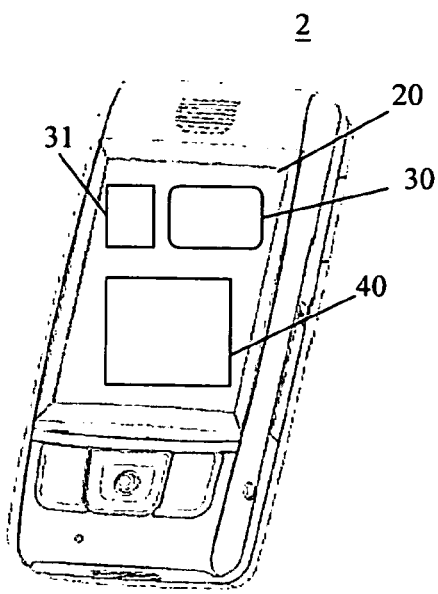
FIG. 4 is a schematic diagram of operating an online consultation apparatus of the present invention.

FIG. 4 is a schematic diagram for illustrating the operation an online consultation apparatus of the present invention. FIG. 4 shows a search screen generated by selecting the question browsing/searching function 202 displayed on the display unit 20 as shown in FIG. 2. As shown, the display unit 20 usually displays a coordinate map 30, a coordinate point of the query terminal 31 and a browsing area 40. Before querying, the query terminal 11 can search previous queries on the browsing area 40 such as "Where is the nearest train station?" or "What is your opinion on some specific topics?", so as to know whether or not the same queries have been stored in the server 10.

Figure 5:
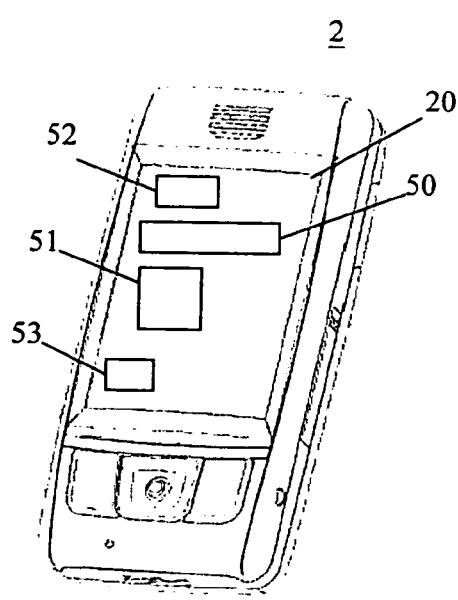
FIG. 5 is a schematic diagram of operating an online consultation apparatus of the present invention.

FIG. 5 is a schematic diagram for illustrating the operation of an online consultation apparatus of the present invention. FIG. 5 shows a display screen selected by the query terminal 11 in FIG. 4 when the same query, such as "Where exactly is the store at?", is found. The display screen includes responses/answers 50 and a coordinate point of the answer terminal 51 such as detail addresses and 24°8'20.4" north latitude and 120°40'52.7" east longitude. In addition, the responses/answers 50 also have a five-star rating 52 given by the query terminal 11. The query terminal 11 can directly press a navigation selection 53 to go to a real geographical position indicated by the coordinate point of the answer terminal 51 by using the GPS 121.

Figure 6:
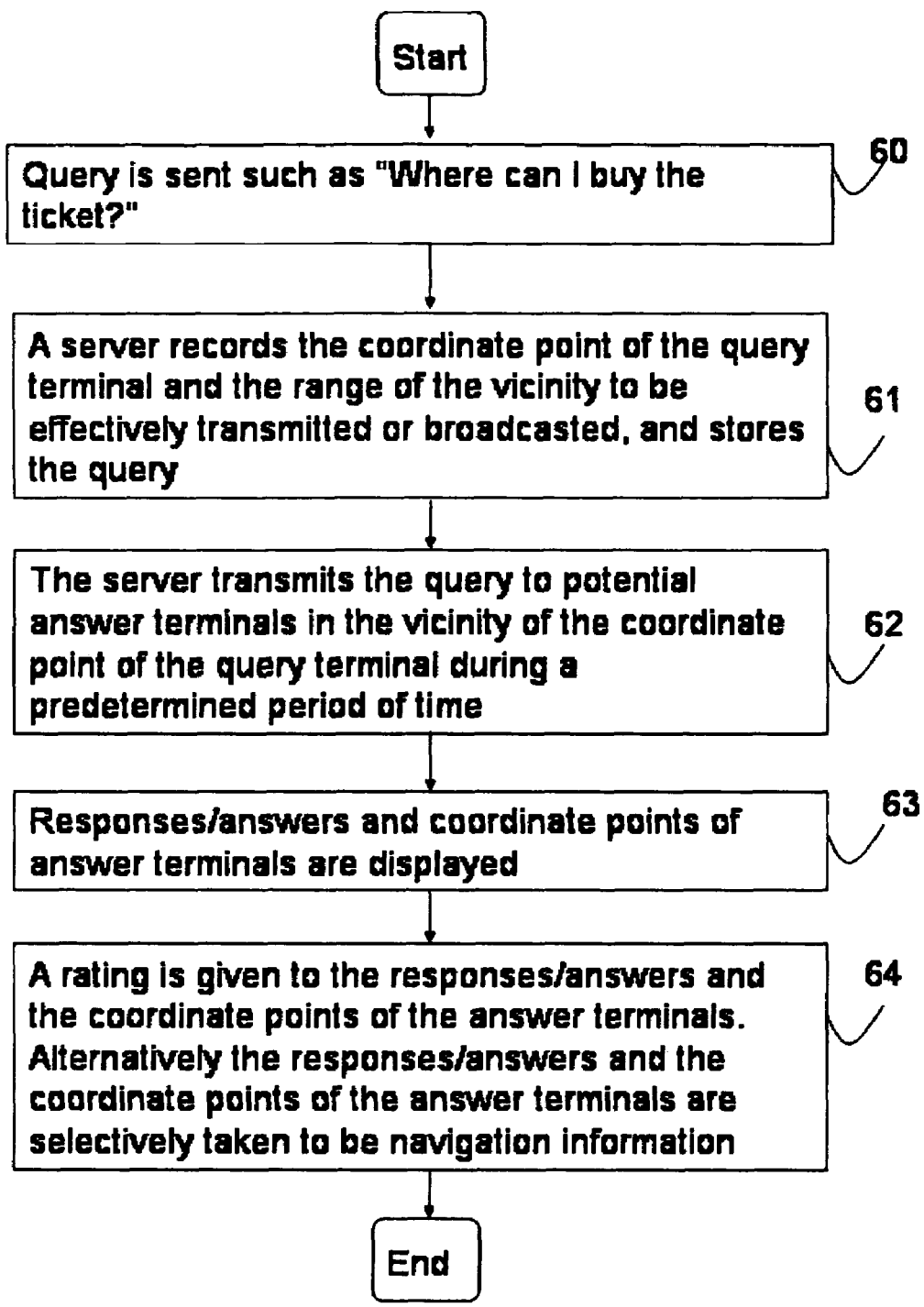
FIG. 6 is a flowchart illustrating an online consultation method of the present invention.

FIG. 6 is a flowchart for illustrating an online consultation method of the present invention. The query terminal in a real geographical position uses an online consultation apparatus or a portable electronic apparatus to perform the following steps:

Step 60: Query is sent such as "Where can I buy the ticket?".

Step 61: A server records the coordinate point of the query terminal and the range of the vicinity to be effectively transmitted or broadcasted, and stores the query.

Step 62: The server transmits the query to potential answer terminals in the vicinity of the coordinate point of the query terminal during a predetermined period of time.

Step 63: Responses/answers and coordinate points of answer terminals are displayed.

Step 64: A rating is given to the responses/answers and the coordinate points of the answer terminals. Alternatively the responses/answers and the coordinate points of the answer terminals are selectively taken to be navigation information.

While the invention has been described by way of example and in terms of a preferred embodiment, it is to be understood that the invention is not limited thereto. It will be apparent to those skilled in this field that various modifications may be made in these embodiments without departing from the spirit and scope of the present invention.

What is claimed is:

1. An online consultation system, comprising:
   at least one server;
   at least one query terminal, for transmitting a coordinate point of said query terminal and at least one query to said server based on the position of said query terminal, and said server obtaining at least one response/answer and a coordinate point based on said query; and
   at least one answer terminal, for obtaining said query through said server in a vicinity of said coordinate point of said query terminal, and for providing said response/answer and said coordinate point of said answer terminal to said server.

2. The online consultation system of claim 1, wherein said server stores said queries and said responses/answers or said coordinate points of said answer terminals so as to provide said query terminals to perform pre-search or post-search.

3. The online consultation system of claim 1, wherein said query terminal uses a portable electronic apparatus for transmitting.

4. The online consultation system of claim 1, wherein said query terminal obtains said coordinate point of said query terminal through a global positioning system (GPS) or a coordinate map.

5. The online consultation system of claim 1, wherein said query terminal selectively gives a rating to said responses/answers and said coordinate point of said answer terminal, and said rating is recorded in said server so as to provide said query terminals for references.

6. The online consultation system of claim 1, wherein said coordinate point of said answer terminal received by said query terminal is taken to be navigation information.

7. The online consultation system of claim 1, wherein said answer terminal uses a portable electronic apparatus or an electronic apparatus with internet access for transmitting.

8. The online consultation system of claim 1, wherein said answer terminal obtains said coordinate point of said answer terminal through a GPS or a coordinate map.

9. The online consultation system of claim 1, wherein the range of said vicinity is selectively setup by said query terminal.

10. An online consultation apparatus, comprising:
    a query unit for transmitting a coordinate point of a query terminal and at least one query to a server based on the position of said online consultation apparatus, and said server obtaining at least one response/answer and a coordinate point of an answer terminal based on said query in a vicinity of said coordinate point of said query terminal; and
    a display unit for displaying said response/answer and said coordinate point of said answer terminal.

11. The online consultation apparatus of claim 10, wherein said server stores said queries and said responses/answers or said coordinate points of said answer terminals.

12. The online consultation apparatus of claim 10, wherein said online consultation apparatus is a portable electronic apparatus.

13. The online consultation apparatus of claim 10, wherein said query unit selectively gives a rating to said response/answer and said coordinate point of said answer terminal, and said rating is recorded in said server.

14. The online consultation apparatus of claim 10, wherein said online consultation apparatus takes said coordinate point of said answer terminal to be navigation information.

15. The online consultation apparatus of claim 10, wherein said answer terminal uses a portable electronic apparatus or an electronic apparatus with internet access for transmitting.

16. The online consultation apparatus of claim 15, wherein said answer terminal obtains said coordinate point of said answer terminal through a GPS or a coordinate map.

17. The online consultation apparatus of claim 10, wherein the range of said vicinity is selectively setup by said query unit.

18. An online consultation method, comprising:
    transmitting a coordinate point of a query terminal and at least one query to a server based on the position of a query terminal;
    obtaining said query from said server and querying at least one answer terminal in a vicinity of said coordinate point of said query terminal;
    providing a response/answer and a coordinate point of said answer terminal to said server from said answer terminal based on said query; and
    transmitting said response/answer and said coordinate point of said answer terminal to said query terminal from said server.

19. The online consultation method of claim 18, wherein said server stores said queries and said responses/answers or said coordinate points of said answer terminals so as to provide said query terminals to perform pre-search or post-search.

20. The online consultation method of claim 18, wherein said query terminal uses a portable electronic apparatus for transmitting.

21. The online consultation method of claim 18, wherein said query terminal obtains said coordinate point of said query terminal through a GPS or a coordinate map.

22. The online consultation method of claim 18, wherein said query terminal selectively gives a rating to said response/answer or said coordinate point of said answer terminal, and said rating is recorded in said server.

23. The online consultation method of claim 18, wherein said coordinate point of said answer terminal received by said query terminal is taken to be navigation information.

24. The online consultation method of claim 18, wherein said answer terminal uses a portable electronic apparatus or an electronic apparatus with internet access for transmitting.

25. The online consultation method of claim 18, wherein said answer terminal obtains said coordinate point of said answer terminal through a GPS or a coordinate map.

26. The online consultation method of claim 18, wherein the range of said vicinity is selectively setup by said query terminal.

27. An online consultation method, comprising:
    transmitting a coordinate point of a query terminal and at least one query to a server based on the position of said query terminal;
    obtaining at least one response/answer and a coordinate point of an answer terminal regarding said query from said server in a vicinity of said coordinate point of said query terminal; and
    displaying said response/answer and said coordinate point of said answer terminal.

28. The online consultation method of claim 27, wherein said server stores said queries and said responses/answers or said coordinate points of said answer terminals.

29. The online consultation method of claim 27, wherein said query terminal uses a portable electronic apparatus for transmitting.

30. The online consultation method of claim 27, wherein said query terminal obtains said coordinate point of said query terminal through a GPS or a coordinate map.

31. The online consultation method of claim 27, wherein said query terminal selectively gives a rating to said response/answer and said coordinate point of said answer terminal, and said rating is recorded in said server.

32. The online consultation method of claim 27, wherein said coordinate point of said answer terminal received by said query terminal is taken to be navigation information.

33. The online consultation method of claim 27, wherein said answer terminal uses a portable electronic apparatus or an electronic apparatus with internet access for transmitting.

34. The online consultation method of claim 27, wherein said answer terminal obtains said coordinate point of said answer terminal through a GPS or a coordinate map.

35. The online consultation method of claim 27, wherein the range of said vicinity is selectively setup by said query terminal.

* * * * *